(12) United States Patent
Sawyer

(10) Patent No.: US 6,262,715 B1
(45) Date of Patent: Jul. 17, 2001

(54) ERGONOMIC COMPUTER MOUSE

(75) Inventor: Albert Joseph Sawyer, Wheaton, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/245,243

(22) Filed: Feb. 5, 1999

(51) Int. Cl.[7] ....................................................... G09G 5/08
(52) U.S. Cl. ................................................ 345/163; 345/156
(58) Field of Search ..................................... 345/163, 156

(56) References Cited

U.S. PATENT DOCUMENTS

| | | | |
|---|---|---|---|
| D. 387,744 | 12/1987 | Kirchhoff et al. | D14/114 |
| 4,780,707 | 10/1988 | Selker | 340/710 |
| 5,157,381 | 10/1992 | Cheng | 340/710 |
| 5,175,534 | 12/1992 | Thatcher | 340/706 |
| 5,287,090 | 2/1994 | Grant | 345/163 |
| 5,296,871 | 3/1994 | Paley | 345/163 |
| 5,355,147 * | 10/1994 | Lear | 345/156 |
| 5,576,733 * | 11/1996 | Lo | 345/163 |
| 5,648,798 * | 7/1997 | Hamling | 345/163 |
| 5,774,113 * | 6/1998 | Barnes | 156/156 |
| 5,894,303 * | 4/1999 | Barr | 345/163 |
| 5,982,356 * | 11/1999 | Akiyama | 345/161 |

OTHER PUBLICATIONS

J.Coates, "Numb to the warnings, I'm now simply numb", Binary Beat, *Chicago Tribune,* May 24, 1998, Sec. 5, p. 5.

* cited by examiner

*Primary Examiner*—Bipin Shalwala
*Assistant Examiner*—Vincent E. Kovalick
(74) *Attorney, Agent, or Firm*—Sitrick & Sitrick

(57) ABSTRACT

An improved ergonomic computer mouse provides comfortable and efficient usage by maintaining the hand of a user at a large acute angle to the horizontal. This is accomplished by a device that includes a base having an upstanding pedestal structure about which the palm and hands of the user extends in a more natural handshake manner at a large acute angle to the horizontal whereby the users wrist remains straight while grasping the mouse. Control means in the base and upstanding structure within easy reach of the users fingers allow the user to efficiently and comfortably control the computer operations. Indentations and an enlarged upper head portion provide for comfortable grasping and easy lifting of the mouse. The pedestal may be rotated 180 degrees to accommodate both right and left handed use. Add-on OEM, and custom fitted embodiments are also disclosed.

16 Claims, 2 Drawing Sheets

ERGONOMIC COMPUTER MOUSE

BACKGROUND OF THE INVENTION

1. Field of the Invention

This invention generally relates to a computer input means and more specifically concerns a computer mouse having an improved ergonomic configuration and cord attachment that increases input efficiency and reduces or avoids stress problems associated with the long term use of prior art devices. The improvement includes embodiments that may be reversed for alternate right or left handed use; may be easily retrofit to an existing mouse as well as used for OEM embodiments; and may be custom fit to a user's hand.

2. Description of Prior Art

A computer input device in the form of what is commonly referred to as a "mouse" is old and well known, however, they have been found to be inefficient and cause user problems.

Since mouse pointing devices became popular in the mid-1980's with early computers such as the Amiga 500, many frequent users have logged hundreds and thousand of miles of mouse travel. Usage of the prior art devices required the user to hold the mouse controlling hand in an awkward position in order to reach the control buttons. It meant the user's hand had to have a horizontal palm-down attitude with the wrist of the hand lying on a flat surface and the longest dimension of the wrist being in a generally horizontal plan generally parallel to the work surface upon which the devices were being used. The horizontal hand position generally necessary for using a computer-mouse pointing device is detrimental to the hand. The twisting necessary is a strain on the muscles and pressure is put on the carpal tunnel. Typical operation is for the right hand to operate the left mouse button with the index finger, which is the greatest stretch. Further, most computer mouse point devices have that button curved downward toward the left side of the mouse, increasing the stretch necessary to operate the mouse.

The generally small size of mouse pads and mouse work areas provided on keyboard trays forces repositioning of the mouse when trying to move the cursor a long way in a single direction, e.g., to move from one side to the other of the screen. The mouse must be lifted to prevent its tracking mechanism from repositioning during the movement. The flat nature of computer mouses forces lifting by squeezing the sides between the thumb and little or ring fingers, a weak grip. An asymmetrical mouse which attempts to address some of the above problems is not useful for a left-handed person. Hands vary widely in size, making a single mouse size uncomfortable for many of its users. Computer mouses are cheap, and subject to breakage and wear. A custom mouse, inherently expensive, with average translation tracking equipment, would break down and require expensive replacement. Increasing the custom mouse's tracking equipment quality would compound the expense, reducing its marketability.

Another disadvantage of prior art devices is that the cord of most computer mouse pointing devices leaves the front of the mouse horizontally, and is generally made of moderately stiff wire which resists bending with a radius smaller than approximately one inch. The cord tends to bind against obstacles commonly found on the desks or workstations. Examples of obstacles are wire guiding holes in a key board shelf provided for the mouse position, backing plates commonly found on workstation keyboard trays, the computer monitor base, the computer box, speakers, etc. The binding introduces resistance making it difficult to adjust the mouse smoothly.

SUMMARY OF THE INVENTION

The present inventions improve user efficiencies and avoid the problems by features such as changing the mouse grasping attitude of the hand and the wrist away from the conventional generally horizontal ("typewriter") bent wrist attitude to a more natural and comfortable upright user friendly position with the wrist straight in what may be characterized as a "handshake" position. In this position, the longest dimension of the wrist generally lies in the plane of the hand which plane is more generally vertical and forms a large acute angle to the horizontal. This position not only promotes more efficient operation but also avoids inefficiencies and problems associated with prior art mouse devices.

Input devices with a vertical hand and wrist attitude are known and used in connection with computer games and take the form of gun-like grips (and joystick devices), however, these devices do not include the mouse features such as a control means in the base which moves a computer cursor in a direction or distance proportional to the movement of the base. Rather, these non-mouse input means have different structures functioning in a different manner to produce a different result.

According to the inventions herein the problems and limitations associated with prior art, mouse type computer input devices are overcome by providing a mouse which allows an upright hand position by having a central pedestal with a somewhat rounded D-shaped cross section. The flat side of the D accommodates the first phalange of the thumb, and will be on the left for a right-handed user. The pedestal is a generally conical frustrum with the wide base on the mouse platform, and a knob protrusion at the top. The knob protrusion at the top of the pedestal is positioned to lie in the crook of the hand just above the thumb and index finger. The purpose of the knob is to allow the mouse to be lifted with minimal squeezing, allowing easy repositioning.

The first computer mouse button may be implemented in the form of a lever or flat actuating surfaces generally vertically oriented at the front of the mouse in a position adapted to be under the flat surface of the third phalange of the index and middle fingers. This allows depression of the button by one or both of these fingers, allowing the user to vary the load on the fingers, or to combine strength to accommodate an already weakened finger. The second mouse button is an angled lever to the right and having an upper end somewhat below the upper end of the first to allow natural placement on it of the third phalange of the ring and little fingers, giving the variation and strength advantages of the first mouse button. The pivot of both levers (if levers) are angled so that natural squeezing of the lever is in the direction of finger travel for easiest movement.

The pedestal on the mouse can be made rotatable to move the flat side from the right to the left to support left-handed operation. The actuating levers would flip on their top pivot mechanisms to reverse the positions of the left and right levers so as to place the upper lever under the index and middle fingers of the left hand. Alternatively, the pivots for the first and second computer buttons could be attached to separate annular rings at the top of the pedestal allowing them to rotate in opposite directions 180 degrees each, which, combined with rotating the pedestal brings them to the front again but in reversed positions.

The pedestal could be designed to be customized to an individual by use of a molding process involving expanding material inside a stretchable membrane. This entails a mechanical release of an activating chemical followed by the prospective user gripping the pedestal in a comfortable position while at the same time resisting the expansion until the material solidifies to form a shape for the mouse pedestal contoured to the user's hand. Lever pivots may be suitably incorporated into the core to be set with the shape, or could be arranged with a mechanical adjustment to be made after setting the shape.

An add-on ergonomic mouse attachment using the principles above is adaptable for use with most manufacturers mouses. Computer mouse pointing devices in general have convex smooth upper surfaces with an elongated shape and operating buttons at the front. The pedestal above is adaptable to have a concave base, possibly just a ring at its outer circumference. The ring can be coated with an adhesive for adherence to the mouse. For additional support there is provided a flexible, adhesive-coated, skirt around the base of the pedestal to increase the area of attachment. Levers attached with a pivot to the top of the pedestal are of a length to reach the mouses's buttons. Compression pressure of the fingers would rotate the lever and thus depress the buttons. As above, two fingers would be able to reach each lever.

It is an object of the invention to provide a comfortable, efficient computer input device that will avoid the stress problems of the prior art.

It is an object of the invention to provide an improved ergonomic computer input mouse device having a base with a first control means for moving a cursor and an upstanding structure on said base about which the palm and fingers of a user extend in a more natural handshake manner inclined at a large acute angle to the horizontal. A second control means associated with the upstanding structure allows the cursor to efficiently and comfortably activate and control computer functions. Indentations for the thumb and fingers provide for comfortable grasping and easy lifting of the mouse.

These and other aspects and attributes of the present invention will be discussed with reference to the following drawings and accompanying specification.

DETAILED DESCRIPTION OF THE PREFERRED EMBODIMENTS

Figure 1:
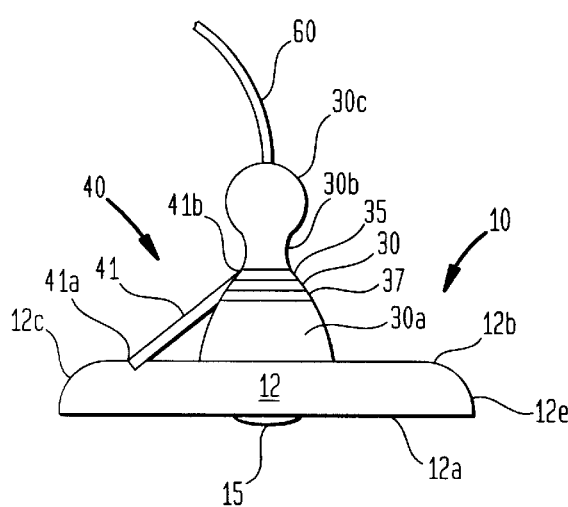
FIG. 1 shows an elevational view of one side of a first embodiment.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 2:
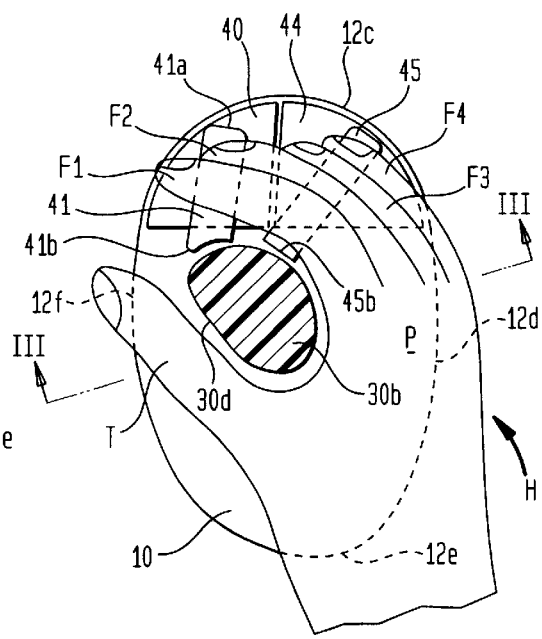
FIG. 2 is a plan view of the embodiment of FIG. 1 with a horizontal cross-section just below the knob and showing a typical user's hand.

FIGS. 1–4 illustrate a first embodiment of the invention which allows users to overcome the deficiencies of the prior art As shown in FIG. 1, the computer input mouse device generally indicated at 10 includes a base 12 having a generally planar lower surface 12a and an upper surface 12b with four outer front, side, rear, and side boundaries generally indicated at 12c–12f in FIG. 2. The base 12 includes a first control means 15 represented by a roller ball extending below the lower surface 12a to contact a supporting surface such as a mouse pad 70. The first control means 15 is typically programmed to control the movement of a cursor wherein the cursor moves in a direction of movement of the control means 15 and a distance proportional to the movement of the control means.

An upstanding pedestal 30 has a lower base portion 30a generally centrally located on base 12 and of a somewhat rounded D-shaped horizontal cross section as may be seen in reduced size in FIG. 2. The fiat side 30d of the pedestal 30 accommodates the first phalange of the thumb T and will be on the left side of 30 for a right-handed user as maybe seen in FIG. 2. The lower portion 30a of the pedestal 30 is generally a frustrum of a cone with the largest portion at the mouse base on upper surface 12a. The pedestal reduces in size to a narrow neck portion 30b as shown in FIG. 2 upon which portion 30b there is positioned a spherically-shaped knob protrusion 30c. The knob protrusion at the top of the pedestal 30 is positioned to lie in the crook of the hand just above the thumb T and index finger F1 as shown in FIG. 2. The purpose of the knob 30c is to allow the mouse to be lifted with minimal squeezing, allowing easy repositioning.

The mouse includes one or more buttons such as illustrated at 40 and 44. The main or first mouse button 40 may be implemented in the form of a lever or flat actuating surface 41 generally vertically oriented toward the front 12c of the mouse 10 with the lever having a first or lower end 41a near the reduced or neck portion 30b. When grasped by the right hand of a user, the surface 41 will be under the flat surface of the third phalange of the index finger F1 and middle finger F2. This allows depression of the button by one or both of these fingers, allowing the user to vary the load on the fingers, or to combine strength to accommodate an already weakened finger.

The second mouse button 44 may take the form of an angled lever or actuating surface 45 to the right of 40 and with a top end 45b somewhat below the end 41b to allow natural placement on it of the third phalange of the ring and little fingers F3 and F4 respectively giving the variation and strength advantages of the first mouse button 40. The pivot of both levers (if levers) are angled so that natural squeezing of the lever is in the direction of travel for easiest movement.

Figure 3:
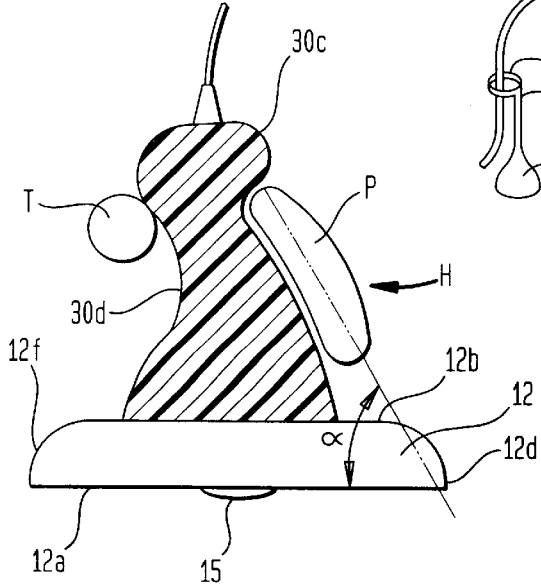
FIG. 3 is a cross sectional elevational view from the front end of the embodiment of FIG. 1 taken along lines III—III.

As may be best seen in FIG. 3, the invention herein voids the detrimental generally horizontal hand and wrist position of prior art mouses and instead inclines the hand H and palm P upright in a more nearly vertical position, as indicated by way of example with the angle alpha ($\alpha$). This more natural position, which may be characterized as a "handshake" position is more natural, user friendly, and overcomes the inefficiencies and problems of the prior art.

Figure 4:
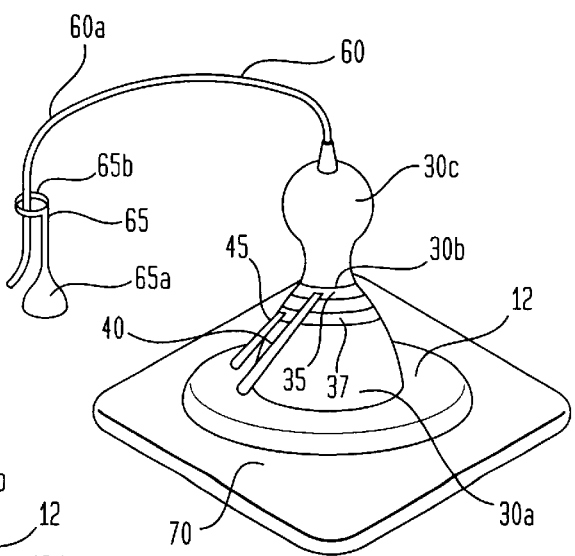
FIG. 4 is a perspective view of the embodiment of FIG. 1.

In contrast with prior art devices where the cord projected out of the front and provided a certain amount of resistance to bending or could bind against obstacles such as holes, keyboards, mouse pads, papers, books, or computers, the cord 60 of the invention, as may be best seen in FIG. 4, rises from the top upper portion 30c of the pedestal 30. A cord support such as shown at 65, which may be placed nearby, allows a loop 60a of the slightly stiff cord 60 to rise slightly in the air away from obstacles such as a mouse pad 70 in an appropriate arc over the tabletop. The loop 60a of cord provides unhindered freedom of movement and either by itself or in combination with supports such as shown at 65 will not bind. The support 65 may take various forms and be attached in various manners. The embodiment of support 65 as shown includes a base 65a at one end resting on or affixed to a support and a loop or guide or clamp portion 65b at a distance away from the base whereby the cord 60 may alternatively be clamped in or easily move or slide in and through the loop 65b during use of the mouse. The support may be flexible.

Figure 5:
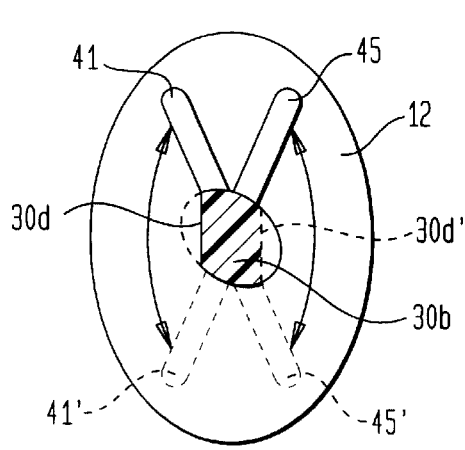
FIG. 5 is a plan view showing alternate right and left handed adaptions of the invention.

The pedestal 30 on the base 12 may be rotatable to move the flat side 30d from the left side as see in the right handed version of FIGS. 2 and 5 to the right side as seen in the left handed version shown by the dotted lines 30d in FIG. 5. With the activating levers 41 and 45 pivotally attached at their upper ends 41b and 45b respectively to the pedestal 30 in the area 30b, upon rotation of pedestal 30, the actuating levers 41 and 45 secured at their top pivot points will rotate to reverse the positions of the left and right levers so as to place the upper lever under the index and middle fingers of the left hand. Alternatively, the pivot points for the first and second computer buttons could be attached to separate annular rings 35 and 37, or 135 and 137, respectively, at the top of the pedestal allowing them to rotate in opposite directions 180° each, which combined with rotating the pedestal bring them to the front again, but in reversed positions, as shown in FIG. 5.

The pedestal could be designed to be customized to fit an individual user's hand by use of an expanding material inside a stretchable membrane. A mechanical release of an activating chemical inside the membrane followed by gripping the membrane and the pedestal in a comfortable position while resisting the expansion until the material solidifies would form a shape for the mouse pedestal contoured to the user's hand. Lever pivots could be incorporated into the core to be set with the shape, or could be arranged with a mechanical adjustment to be made after setting the shape.

Figure 7:
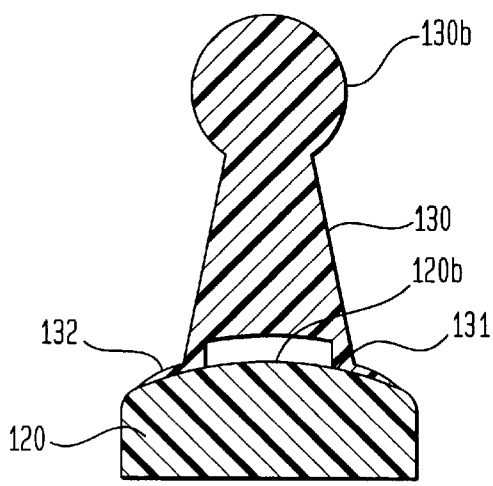
FIG. 7 is a cross-section of FIG. 6 take along lines VII—VII.
Figure 6:
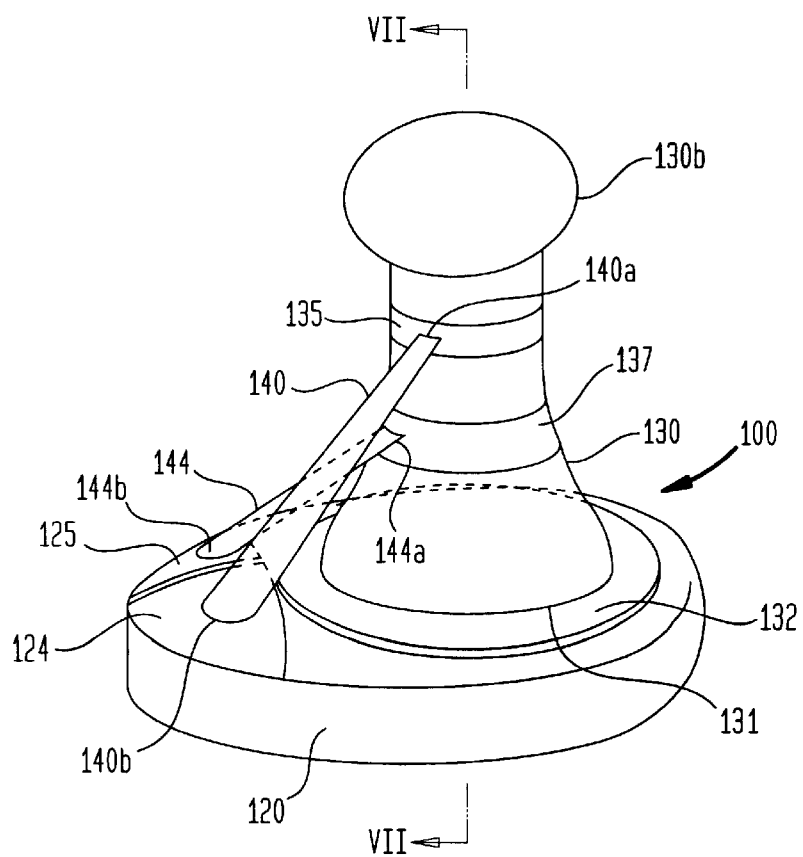
FIG. 6 is an elevational perspective view of a second embodiment of the invention.

An ergonomic mouse attachment generally indicated at 100 using the principles above could be made for use with any manufacturer's mouses. Computer mouse pointing devices, such as 120 in FIGS. 6 and 7 typically have convex smooth upper surfaces 120b with an elongated shape and operating buttons 124, 125 at the front. The pedestal 130 above may have a concave base, as shown in FIG. 7, which may be possibly just a ring 131 at its outer circumference. The ring 131 can be coated with an adhesive for adherence to the mouse 120. For additional support, there can be a flexible, adhesive-coated skirt 132 around the base of the pedestal 130 to increase the area of attachment. Levers 140, 144 attached with a pivot to the top of the pedestal could be designed to reach buttons 124, 125 on the mouse 120. Compression movement of the user's fingers would rotate the levers 140, 144 about pivot points 140a, 144a respectively, and cause the button engaging portions 140b, 144b of levers 140, 144 respectively to depress the mouse buttons 124, 125 respectively. As above, two fingers would be able to reach each lever. See FIGS. 6 and 7.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computer mouse comprising:
    a base with a front side and having an upstanding pedestal structure thereon, said pedestal structure having an enlarged knob head portion above a narrow neck portion;
    a first computer control button adjacent said front side of said base and associated with said pedestal, said first control button having an upper end and a lower end, said control button having a generally vertically oriented surface adapted to be under the surface of the third phalange of the index and middle fingers of the user;
    a second computer control button adjacent said first control button and associated with said pedestal, said second control button having an upper end and a lower end, said upper end of said second control being below the upper end of said first control button, said second control button being adapted to contact the third phalange of the ring and little fingers of a user;
    wherein first and second control buttons are pivotally attached to said pedestal, said buttons being angled so that its direction when naturally squeezed by the user's fingers is in the direction of finger travel.

2. A computer mouse according to claim 1, wherein a first control button is attached to said pedestal in the area of said narrow neck.

3. A computer mouse according to claim 1, wherein said pedestal has an enlarged lower body potion contacting said base and generally frustro conical portion between said upper and lower portion; said pedestal having a somewhat rounded D-shaped horizontal cross-section.

4. A computer mouse according to claim 3, wherein said frustro conical portion has a generally vertical, generally flat surface along a first side adapted to be adjacent a first phalange of a user's thumb.

5. A computer mouse according to claim 1, wherein the first control button is a lever.

6. A computer mouse according to claim 1, wherein said pedestal includes first and second rings, said first and second computer control buttons being attached to said first and second rings respectively, said rings being rotatable independently of said pedestal.

7. A computer mouse according to claim 1, wherein a cord connecting said mouse to said computer extends from the upper portion of the pedestal.

8. A computer mouse according to claim 7, further including an upstanding cord support receiving said cord and located away from said mouse and being adapted to hold said cord above the place upon which the mouse operates.

9. A computer mouse according to claim 8, wherein said support is of a flexible material and includes a clamp means for receiving and holding said cord.

10. A computer mouse comprising:
    a base with a front side and having an upstanding pedestal structure thereon, said pedestal structure having an enlarged knob head portion above a narrow neck portion;
    a first computer control button adjacent said front side of said base and associated with said pedestal, said first control button having an upper end and a lower end, said control button having a generally vertically oriented surface adapted to be under the surface of the third phalange of the index and middle fingers of the user;

wherein said pedestal and button thereon is rotatable on said base about a vertical axis so that the mouse may be used by either the right or left hand of the user with equal facility;

wherein said first computer control button is attached to a ring on said pedestal, said ring being rotatable independently of said pedestal whereby it may rotate in a direction opposite to the rotation of said pedestal.

11. An ergonomic computer input device attachment for an existing mouse adapted to be held by and moved by a hand of the user comprising:

a lower portion adapted to be secured to an upper surface of an existing mouse, said existing mouse having a control button thereon, said attachment including an upstanding pedestal structure mounted on said mouse adapted to be cradled by the hand of the user;

a force transmitting means attached to said pedestal and extending between the upstanding structure and the control button whereby pressure force by a finger of the hand of the user on the force transmitting means activates the control button.

12. An ergonomic computer input device according to claim 11, wherein said existing mouse has a lower surface and an upper surface, said upper surface having a forward portion forward of said upstanding structure, said control button means and said force transmitting means being in said forward portion.

13. An ergonomic computer input device according to claim 11, wherein said force transmitting means extends between said upper surface and said upstanding pedestal structure, and has a first end pivotally attached to said upstanding structure and a second end bearing on said control button.

14. An ergonomic computer mouse design comprising an upstanding pedestal structure with control means thereon adapted to be mounted on a base by suitable means, said upstanding pedestal structure being of significant height whereby the hand of a user grasping said upstanding structure is inclined to the horizontal at a large acute angle;

wherein said control button associated with said upstanding pedestal structure is adapted to extend to and engage said control buttons on said base, said upstanding structure being of a configuration whereby when grasped by the hand of the user in a handshake type grip the control means are within easy reach of the users fingers.

15. An ergonomic computer input device according to claim 14, wherein said upstanding structure has indentations adapted to receive the thumb of a user to facilitate the comfortable grasping and lifting of said mouse.

16. An ergonomic computer input device according to claim 14, wherein said pedestal has a generally frustro conically shaped based with a large lower portion, a reduced neck, and an enlarged head portion.

* * * * *